W. J. PANNIER, Jr.
STAMP.
APPLICATION FILED SEPT. 25, 1912.
Reissued Jan. 28, 1913. 13,521.
Fig. 1.
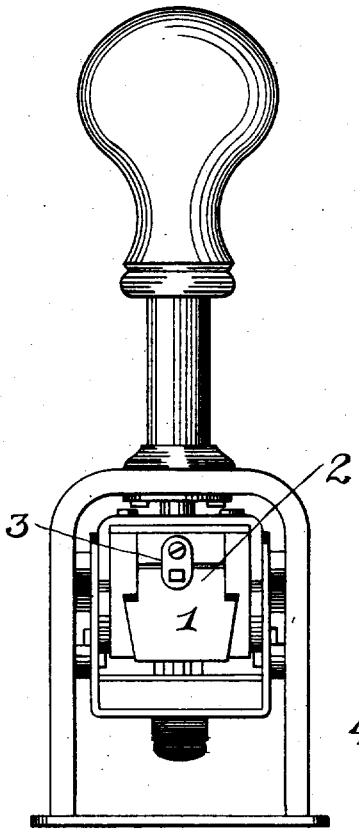
Fig. 2.
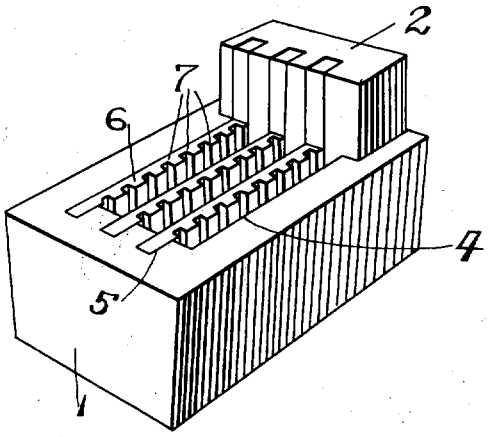
Fig. 3.
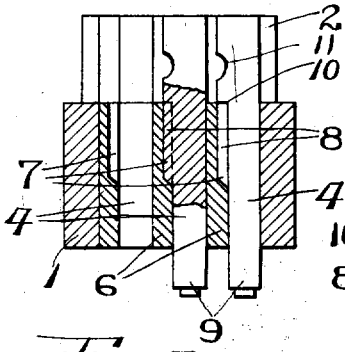
Fig. 4.
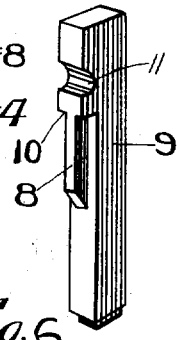
Fig. 5.
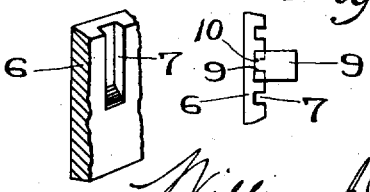
Fig. 6.
WITNESSES:
W. A. Buckman
Fred'k. Staul
William J. Pannier Jr. INVENTOR.
BY
C. M. Clark ATTORNEY.
COLUMBIA PLANOGRAPH CO., WASHINGTON, D. C.

UNITED STATES PATENT OFFICE.

WILLIAM J. PANNIER, JR., OF PITTSBURGH, PENNSYLVANIA, ASSIGNOR TO PANNIER BROTHERS STAMP COMPANY, OF PITTSBURGH, PENNSYLVANIA, A CORPORATION OF PENNSYLVANIA.

STAMP.

13,521. Specification of Reissued Letters Patent. Reissued Jan. 28, 1913.

Original No. 1,030,120, dated June 18, 1912, Serial No. 667,806. Application for reissue filed September 25, 1912. Serial No. 722,371.

*To all whom it may concern:*

Be it known that I, WILLIAM J. PANNIER, Jr., a citizen of the United States, residing at No. 154 Charles street, N. S., Pittsburgh, in the county of Allegheny, State of Pennsylvania, have invented certain new and useful Improvements in Stamps, of which the following is a specification.

My invention relates to stamps of that class which are operable by hand and have detachable type holders provided with detachable type, whereby the type can be changed when it is desired to revise the markings of the stamp.

One of the primary objects of my invention is to eliminate the use of spacers or fillers when arranging type within the type holder, the use of such spacers or fillers requiring a degree of accuracy and considerable labor and time that are eliminated by my invention.

A further object of the invention is to provide a type holder and type that can be placed within the holder and accurately spaced, the type being held in proper operative position, even when not closely arranged.

A further object of the invention is to accomplish the above results by a construction which is inexpensive to manufacture, durable, applicable to various forms of stamps, and highly efficient for the purposes for which it is intended.

The invention also includes a novel construction of type.

With the above and other objects in view, the invention resides in the novel construction, combination and arrangement of parts hereinafter specifically described and claimed.

Reference will now be had to the drawing wherein—

Figure 1 is a front elevation of a stamp in accordance with this invention. Fig. 2 is an enlarged perspective view of a type holder. Fig. 3 is a cross sectional view of the same. Fig. 4 is an enlarged perspective view of a detached type. Fig. 5 is a perspective view of a portion of a bar of the type holder. Fig. 6 is a plan of the same showing the type in engagement therewith.

In Fig. 1 there is illustrated an ordinary and well known type of stamping device and my invention in connection with the same pertains particularly to a type holder 1 that is detachably mounted within the stamping device, and to the type therefor. The type holder 1 has a head 2 limiting the movement of said holder within the stamping device, said holder being retained therein by a pivoted latch 3. The type holder 1 is provided with a rectangular vertical opening 4 having the end walls thereof provided with vertical parallel slots 5. The slots 5 are equally spaced, and arranged in said slots are the ends of parallel bars 6, one of said bars being arranged against the longitudinal wall of the opening 4 with the other bars equally spaced and with one of the bars spaced from the other longitudinal wall of the opening 4. One side of each bar 7 is provided in its upper portion with a series of vertically disposed parallel sockets 7, the depth of which is approximately half the depth of the bar. These sockets are adapted to receive tongues 8 carried by the type bars 9. The upper ends of the tongues 8 are integral with heads 10 of the type bars 9, said heads limiting the movement of the type bars in the bars 6. The type bars 8 are rectangular in cross section and of such size that the sides of the bars will substantially abut when all of the sockets 7 are filled. The other sides of the type bars will engage the confronting faces of the bars 6, and even though the type bars are not compactly alined, said type bars will be maintained in a vertical position by the bars 6 and prevented from becoming accidentally displaced when the stamping device is in use. The tongues 8 serve functionally as liners or spacers by maintaining the type bars in a vertical position, said tongues being of such length as to rigidly support the type bars, besides limiting the movement of the bars in the holder, thereby correctly positioning the same. Each type bar 9 is provided with a notch 11 transversely across its edge face for withdrawing the type bar by the finger nail of the operator and for determining its proper location.

It will be obvious that by reason of the type bar being supported in the receiving opening upon its shoulder 10, the seating of the bar is therefore entirely independent of the bearing of the tongue 8 on the bottom of the receiving socket 7 or the particular shape of the bottom of said socket or of the tongue 8 so that the socket may be longer than the tongue if desired.

What I claim is:

1. A type holder having a rectangular opening, the end walls of said opening being provided with spaced parallel slots, spaced parallel bars having their ends mounted in said slots, each of said bars having one face thereof provided with a series of parallel sockets arranged in the upper portions of said bars, type bars arranged between said bars, tongues carried by one side of said type bars and extending into said sockets, and heads integral with the upper ends of said tongues and engaging the tops of the said bars provided with sockets.

2. A type holder having a rectangular opening, the end walls of said opening being provided with spaced parallel slots, spaced parallel bars having their ends mounted in said slots, each of said bars having one face thereof provided with a series of parallel sockets, said sockets arranged in the upper portions of said bars, type bars arranged between said bars, tongues carried by one side of said type bars and extending into said sockets, and heads integral with the upper ends of said tongues and engaging the tops of the said bars provided with sockets, the bottom wall of each of said sockets being beveled and the lower end of each of said tongues being beveled for engagement with the beveled wall of its respective socket.

3. A type holder having a rectangular opening and provided at one side of said opening with a series of parallel slots or sockets terminating in top shouldered portions, and type bars arranged in said opening having tongues engaging said sockets and heads integral with the upper ends of said tongues and engaging the upper shouldered portions of said sockets, substantially as set forth.

4. A type holder having one or more transverse bars provided at one side with a series of parallel slots or sockets terminating in top shouldered portions, and type bars arranged to seat against said bars having tongues engaging said sockets and heads integral with the upper ends of said tongues and engaging the upper shouldered portions of said sockets, substantially as set forth.

5. A type holder having a rectangular opening and provided at one side of said opening with a series of parallel slots or sockets terminating in top shouldered portions, and type bars arranged in said opening having tongues engaging said sockets and heads integral with the upper ends of said tongues and engaging the upper shouldered portions of said sockets, and provided with notches across their faces above the bearing portions of said heads, substantially as set forth.

6. The combination of a type holder having a shouldered slotted opening, of a type having a rectangular body portion provided with a guiding tongue and a bearing head adapted to engage said opening and its shoulder respectively, substantially as set forth.

7. The combination of a type holder having a shouldered slotted opening, of a type having a rectangular body portion provided with a guiding tongue and a bearing head adapted to engage said opening and its shoulder respectively, and a notch across the edge of the type beyond the bearing portion of said head, substantially as set forth.

8. The combination of a type holder having a shouldered slotted opening, of a type having a rectangular body portion provided with a centrally arranged guiding tongue and a bearing head adapted to engage said opening and its shoulder respectively, substantially as set forth.

9. The combination of a type holder having a shouldered slotted opening, of a type having a rectangular body portion provided with a head and a centrally arranged guiding tongue integral with the head adapted to engage said opening and its shoulder respectively, substantially as set forth.

10. The combination of a type holder having a shouldered slotted opening, of a type having a rectangular body portion provided with a head and a centrally arranged guiding tongue integral with the head adapted to engage said opening and its shoulder respectively, said type having a notch across the edge of the type beyond the bearing portion of said head, substantially as set forth.

In testimony whereof I have hereunto set my hand and seal this 16th day of September, A. D. 1912.

WILLIAM J. PANNIER, JR. [L. S.]

In presence of—

C. M. CLARKE,

FREDK. STAUB.

Copies of this patent may be obtained for five cents each, by addressing the "Commissioner of Patents, Washington, D. C."